Oct. 12, 1943.   O. S. PETTY   2,331,627
TIME-BREAK CIRCUITS
Filed June 27, 1940   2 Sheets-Sheet 1
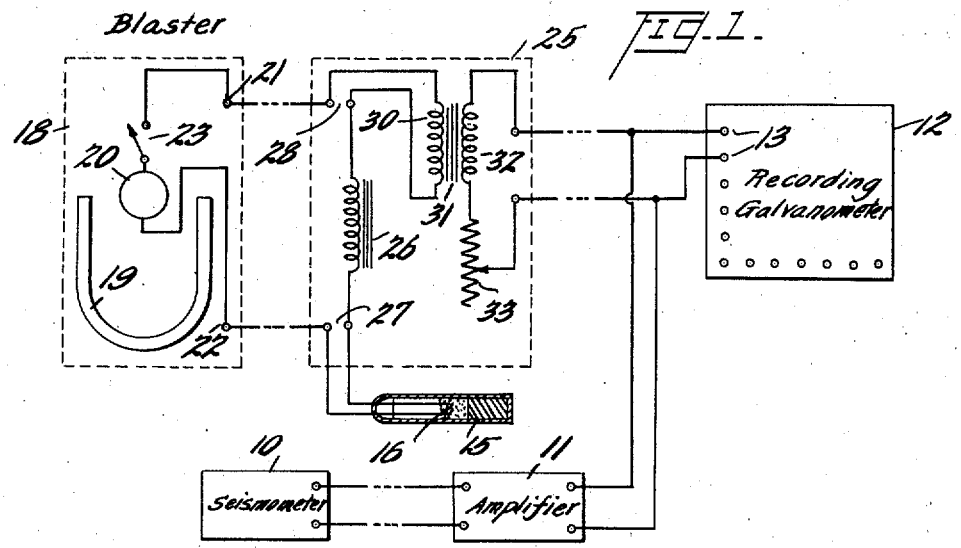
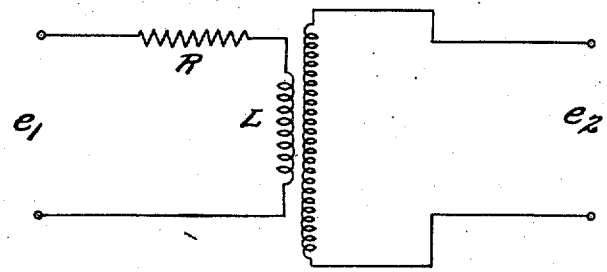
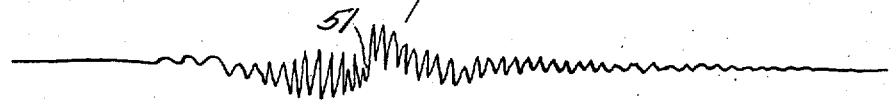
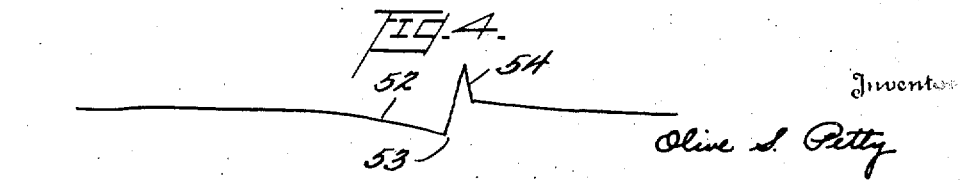
Inventor
Olive S. Petty
By Watson, Cole, Grindle
& Watson
Attorney Oct. 12, 1943.  O. S. PETTY  2,331,627
TIME-BREAK CIRCUITS
Filed June 27, 1940  2 Sheets-Sheet 2
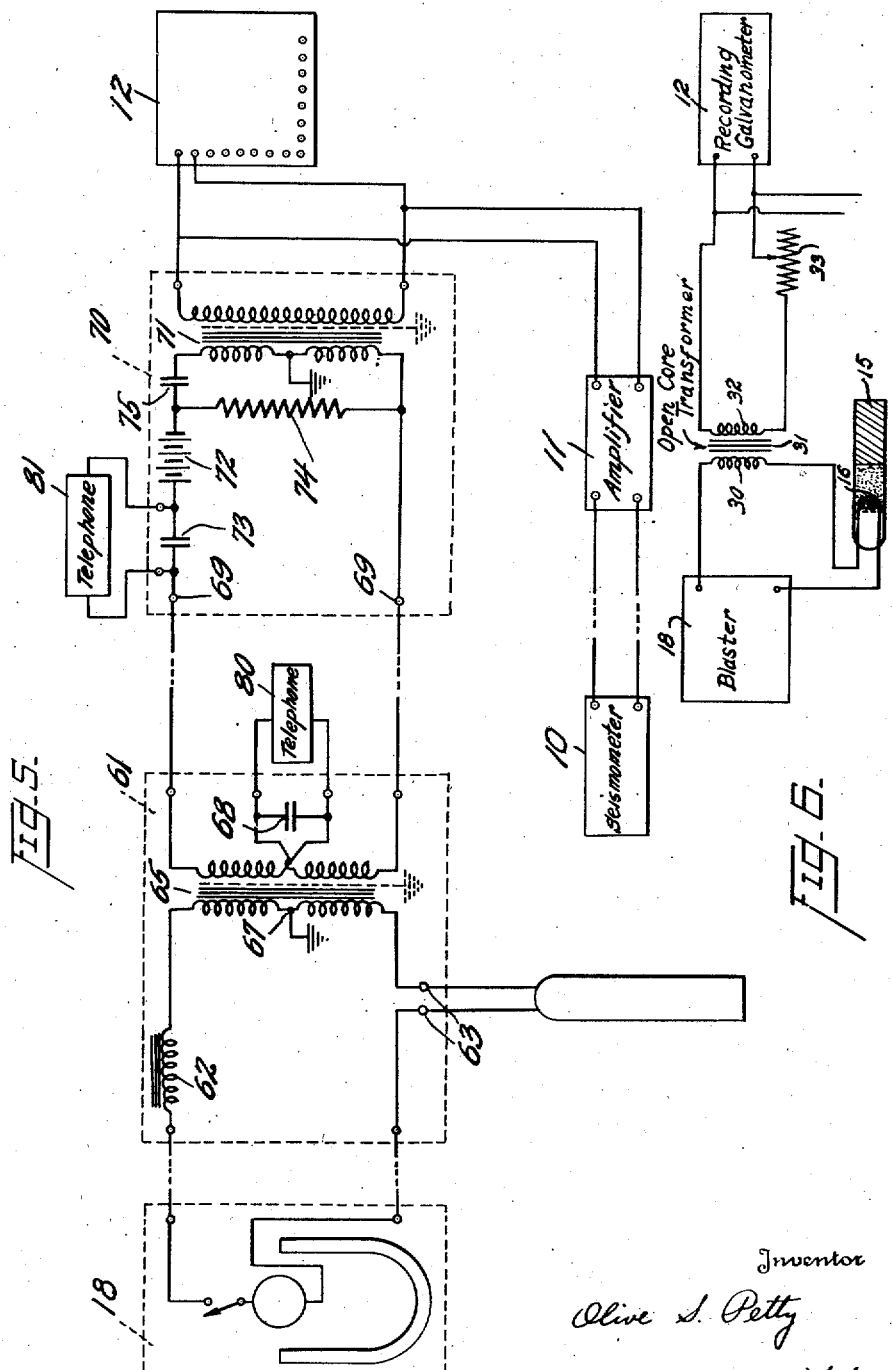
Inventor
Olive S. Petty
By Watson, Cole, Grindle & Watson
Attorney Patented Oct. 12, 1943

2,331,627

UNITED STATES PATENT OFFICE

2,331,627

TIME-BREAK CIRCUIT

Olive S. Petty, San Antonio, Tex.

Application June 27, 1940, Serial No. 342,794

7 Claims. (Cl. 234—1.5)

This invention relates to geophysical prospecting, and more particularly to improved methods of and apparatus for recording the time-break or instant of explosion on the trace of a recording galvanometer, and if desired placing on the subsequent portions of the same trace records of the arrival of seismic waves, initiated by the explosion, at a particular seismometer.

The invention is particularly applicable to systems in which the firing of the blasting cap used for initiating the explosion, which creates artificial seismic waves, is accomplished by the usual direct current type magneto-electric blasting machine, and where it may be desired to record on a single galvanometer trace the exact time of explosion and a record of seismic waves arriving at one particular seismometer station.

It is a general object of the present invention to provide a novel and improved system, circuits and apparatus for seismic recording.

More particularly, it is an object of the invention to arrange, in combination with a recording galvanometer, a blasting circuit comprising a magneto-electric blasting machine, the bridge wire of a blasting cap, and suitable means to prevent the development of a current sufficiently great to melt the bridge wire of the cap whereby the same may be broken by the force of the cap explosion.

A further object of the invention consists of the provision of means for associating a blasting circuit and a recording galvanometer, whereby high frequency oscillations resulting from the breaking of the blasting cap bridge wire are suppressed, and a quick sharp time-break of short duration is recorded on the galvanometer chart.

A still further object of the invention consists in the arrangement of a blasting circuit comprising a magneto-electric blaster, an inductance, a transformer primary, and the bridge wire of a blasting cap in series, the inductance and primary having such reactance characteristics compared with the high resistance of the bridge circuit, when opened, that the oscillating signal generated by the disruption of the bridge wire is electrically differentiated resulting in a steeper wave front and more discernible trace on the record.

Other and further features and objects of the invention will be more apparent to those skilled in the art upon a consideration of the accompanying drawings and the following specification, wherein are disclosed several exemplary embodiments of the invention with the understanding that such changes in and combinations of these embodiments may be made as fall within the scope of the appended claims without departure from the spirit of the invention.

In said drawings:

Figure 1 is a schematic wiring diagram of apparatus for carrying out the method of the present invention;

Figure 2 is a view of a circuit which is the simplified equivalent of Figure 1 showing the derivative taking characteristics thereof;

Figure 3 is a reproduction of a galvanometer recording of a time-break made without use of the present invention;

Figure 4 is a view similar to Figure 3, showing the results attained by use of apparatus and methods according to the present invention;

Figure 5 is a view similar to Figure 1, but showing a slightly different form of circuit modified for use with a telephone system for communication between the shooter and the recording station; and Figure 6 is a schematic wiring diagram similar to that of Figure 1.

In the conduct of geological prospecting of the type making use of a plurality of portable seismometers, arranged along or near the surface of the ground, for recording on a single chart the consequent effects thereon of seismic waves originally emanating from artificial shock such as an explosion, it is extremely important to record on the same chart the exact instant of the explosion. If the matter of small increments of time were disregarded, the problem would be a relatively simple one, but for the work in question, time intervals on the order of one-thousandth of a second, or less, are extremely important. There can easily be that much lag, known as the "bridge break" between the time of applying current to the bridge wire of the blasting cap and the actual explosion of the detonating material used to fire the explosive which creates the seismic waves. It is very difficult to determine from the electric circuits normally used for energizing the bridge wire of the blasting cap just when the explosion takes place. It has been suggested that a wire be wrapped about the charge of explosive, and its disruption used to create a signal for recording the time break, but this adds to the complication and the amount of equipment necessary, and in the event of leakage in the conductors leading to the explosive, may fail to give any worthwhile result. Furthermore, the use of additional wires in the shot hole is more dangerous, costly, and troublesome, and increases the difficulty of loading the charge in the hole.

Since the explosive is at the bottom of a relatively deep hole, which is usually filled with water, the chances of leakage are extremely high. Even the expedient of using a second cap in series with the first and placed at the top of the hole is not wholly satisfactory since the caps may not fire simultaneously due to differences in the caps created during manufacture, such as differences in diameter of bridge wire and characteristics of fulminate. It is further possible that one cap may explode and not the other. If the surface cap fails there will be no record of the time break. If the cap in the charge fails then an additional surface cap would have to be used, adding to the cost and consuming time to wire it in place.

The applicant has discovered that the time break can be satisfactorily obtained from the blasting circuit if care is taken to ensure that the bridge wire of the blasting cap is not burned through by the current used to heat the same. The amount of current necessary to fuse this wire can be readily ascertained, and is from one to five amperes with commercially available caps. If the current in the blasting circuit is relatively slowly brought up to just slightly less than this amount, the cap can be safely detonated without the wire having been burned out. The bridge wire will, however, be disrupted by the explosion, and of course, at the exact instant at which this takes place. It then becomes a matter of creating a signal by the disruption of the bridge wire and using this signal to actuate the recording galvanometer.

The signal obtained in this manner, however, may be subject to several deficiencies. If the constants of the various circuits are proper, or if the damping of the moving element of the galvanometer is not high, several forms of oscillation may occur which cause the galvanometer element to move at high frequency, through a wide range, and to continue to move over a relatively long period of time. The exact instant of the break cannot readily be determined from the record of such a movement, and the long interval of time during which it survives effectually prevents the use of this galvanometer element for recording seismic shocks sustained by one of the seismometers of the system. In accordance with one feature of this invention, the higher frequency components of the commutator ripple from the blaster are eliminated so that the time-break appears sharp and clear, and the galvanometer element subsides with great rapidity.

For a better understanding of the invention, reference should now be had to Figure 1 of the drawings, which discloses, in more or less conventional form, certain circuit elements to be found in any system of seismic recording as well as the elements required for the present improvements. At 10 is shown any recognized type of seismometer, spaced an appropriate and known distance from the source of explosion, and connected to an amplifier 11, for increasing the intensity of the varying voltage waves generated by the seismometer, and for applying the same to one of the many moving elements of the recording galvanometer 12, for which purpose it is connected to a pair 13 of the binding posts of this galvanometer. The recording galvanometer 12 is of conventional construction and includes, in addition to the moving elements actuated by electrical waves, some means for recording this movement in respect to time.

The remaining sets of binding posts will be considered as connected to additional moving elements of the galvanometer which may be used for recording the reception of seismic waves at other stations.

The blasting cap 15, which may represent, for the purpose of this explanation, the explosive charge, contains an appropriate fulminate, as well as an electric bridge wire 16. This wire is electrically heated to ignite the fulminate and detonates the blasting material. At 18 is shown a more or less conventional blasting machine, comprising a permanent magnet 19, and a rotatable, wound armature 20, equipped with a commutator from which brushes carry current to the terminals 21 and 22 of the machine when the armature is rotated. On the conventional form of these devices, a manually operable plunger handle is pressed downward to rotate the armature, and at the end of its stroke, closes the normally open switch 23 to complete the circuit from the armature to the terminals 21 and 22. In this manner the armature is allowed to be brought up to speed at no load, and the load is suddenly applied at the end of the manual operation when the armature speed is a maximum. A blasting machine is preferred to any other source of current for safety reasons even though it introduces into the circuit of the cap the very undesirable commutator ripple requiring a special circuit to eliminate as will be later described.

Such a blasting machine may generate up to 15 or 20 amperes at the instant of closing the switch, whereas approximately three to five amperes is sufficient to melt the bridge wire of a cap. As previously explained, it is desired that this wire be not melted, so that the apparatus shown in the casing 25 is interposed between the blasting machine and the cap. It includes an iron core choke 26 so disposed between the sets of terminals 27 and 28 that it is in series between the blasting machine and the cap. This choke has a sufficiently high self-inductance so as to limit the rate of current increase therein so as to permit heating of the bridging wire to a temperature where it will ignite the fulminate before melting. Alternatively, it will limit the current to a definite value insufficient to ever melt the bridging wire of the cap.

When the bridging wire 16 is disrupted by the explosion of the fulminate, the sudden cessation of current flow induces a signal in the blasting circuit resulting from the collapse of the magnetic field of the choke, and in order that this may be recorded by the galvanometer, some means for coupling the blasting circuit to the galvanometer moving element is required, which in the present instance is incorporated in the casing 25. It includes the primary 30 of a suitable transformer 31, connected in series between the blasting machine and the inductance 26. The secondary 32 of this transformer is connected through an adjustable rheostat 33 to the terminals 13 of the recording galvanometer, which also accommodate the conductors from the amplifier 11. Of course this time-break circuit need not be connected to the same galvanometer as one of the seismometers; but for convenience, lightness and economy this is desirable.

If the primary of the transformer has adequate self-inductance, it may be used in lieu of the choke 26, although it is not necessary that this transformer have an iron core.

The primary purpose of the inductance in the circuit has already been explained as limiting the current flow to the bridging wire, but it has several additional functions. The commutator of the blasting machine normally produces a ripple of varying frequency in the cap circuit. The self-inductance of the choke serves to smooth out this ripple and keep it from being transmitted, via the transformer, to the moving element of the galvanometer. The sudden disruption of the circuit upon the breaking of the bridging wire tends to produce oscillations, and these are suppressed by the inductance of the choke.

In Figure 3 is illustrated a record such as might be made by the galvanometer, if the customary blasting circuit were directly coupled to the moving element thereof. In this case, the great number of relatively high amplitude oscillations 50 extend over a long period of time, and their swings are so rapid that the photographic trace is severely attenuated. The frequency is also so high that the galvanometer response is poor. It is difficult from this record to ascertain the exact time when the break 51 of the bridging wire occurred. This break is only a small deformation in a rapidly moving line, and its exact instant of occurrence is almost impossible to determine.

When apparatus according to the present invention is used, the high frequency oscillations are choked out, as previously described, and the galvanometer moving element is deflected slowly in one direction only, as shown by the smooth curve 52 of Figure 4. This deviation records the slow build up of current in the circuit resulting from the self-inductance of 26. The exact instant of bridge wire break is represented by the sharp angle 53, readily determinable because of the change in direction of movement due to the decrease in current when the bridge breaks. Thereafter the deflection swings over the zero line as a result of momentum in the galvanometer element and then returns to zero along the line 54 very quickly, leaving the galvanometer element quiet for the almost immediate reception of seismic waves from the seismometer 10. These waves arrive somewhat later than the time-break, since they must travel through earthy materials, with a finite rate of travel, over the considerable distance from the explosion to the seismometer.

The circuit described above not only has the important characteristics already described but it is capable of electrically performing the equivalent of a mathematical derivation of the signal voltage created by the breaking of the bridge wire in the cap. It is recognized that the voltage measured across an inductance of low impedance, in series with a resistor of high impedance is approximately the time derivative of the current in the circuit. A circuit such as shown in Figure 2 is capable of performing this derivation and is the simplified equivalent of the essential parts of Figure 1. If in Figure 2 it is considered that $e_1$ is the alternating voltage obtained as a result of the oscillations occurring upon the break of the bridge wire $e_2$ is the voltage output after passing through the differentiating circuit, the mathematical analysis will appear as follows.

It may be assumed that $e_1 = E \sin \omega t$, where E is a constant, $\omega = 2\pi f$, $f$ is the frequency in cycles per second, and $t$ is the time in seconds. For a complex wave in a particular case, this assumed sinusoidal wave may be considered as representing a single term of a Fourier's series giving the actual wave.

The circuit in Figure 1 is essentially the same as that of Figure 2 if it is considered that the inductance 26 and the primary 30 of the transformer represent L, and R is represented by the resistance of the bridge wire when broken. This is a correct assumption since the resistance in the shot hole is high immediately following the explosion but not before. The inductance of the transformer primary is relatively low and since the inductance 26 is constructed to have the core substantially saturated when the current in it gets large enough to fuse the cap bridge wire, its inductance is reduced to a small value. With the alternating voltage $e_1 = E \sin \omega t$ placed across the input, the current $i$ in the primary circuit, with a small current in the secondary, may be obtained from the equation $$E \sin \omega t = iR + L\frac{di}{dt}$$

where R is the total resistance in ohms and L is the inductance in henrys.

With R large with respect to $L\omega$, the voltage across the secondary becomes $$e_2 = \frac{M}{R}(E\omega \cos \omega t)$$

or $$e_2 = \frac{M}{R}\frac{de_1}{dt}$$

where M is the mutual inductance in henrys between the primary and secondary coils. The last equation shows that the output voltage from the transformer is substantially the first derivative of the input voltage $e_1$, since M and R are constants.

The trace of a derivative of a varying voltage exhibits steeper slopes for all portions of the curves than does the trace of the voltage particularly where the curves deviate from approximately the horizontal, making it much simpler for the computer, who interprets the records to determine the exact point of inflection in terms of time. Deflections above and below horizontal on these records indicate intensities, while horizontal directions are measured in time and since the intervals are extremely small it is of the utmost importance in the interest of correct interpretation to be able to definitely and quickly locate any point in respect to a known time line which appears on the record.

There are of course other known circuits capable of electrically performing the equivalent of a mathematical derivation but the one shown in Figure 2 is satisfactory for the purpose of illustrating the operation of this invention, since it is the nearest equivalent to the actual circuit used by the applicant which is known to operate in the manner explained. The actual circuit used is advantageous since it is not differentiating until the cap breaks, thus producing a sharper deflection to indicate this happening. Also the galvanometer element is quieter up to the time break.

The apparatus shown in Figure 5 combines the mechanism of Figure 1 with a telephone system permitting communication between the shooting station and the operator at the recording station and at the same time combines equipment which serves to prevent cross-coupling of the time-break signal onto any adjacent conductors leading to the recording galvanometer from other seismometers. These conductors run closely adjacent to each other where the various cables are brought into the recording station.

Referring now to Figure 5, there is shown at 18 a blaster identical with that shown in Figure 1. This is coupled to the shooter's box 61 containing the inductance 62 arranged to be connected in series with the terminals 63 leading to the blasting cap and with the primary of transformer 65 as in Figure 1.

The transformer 65 is of the electrostatically shielded type as clearly shown and has a divided primary, the inner leads of which are grounded as at 67. It likewise has a two-part secondary and the inner ends of the two windings are connected through a condenser 68. The outer ends are connected to the terminals of the shooter's box for connection to a cable leading to the recording station. Here these cables are connected to the terminal 69 of a box 70 containing a second electrostatically shielded transformer 71, the primary of which is connected to the terminals of the box in series with a battery 72 and condenser 73. The primary is shunted by a resistor 74.

The secondary of this transformer 71 is arranged to be connected directly or through a suitably adjustable potentiometer (not shown) to the recording galvanometer 12. To the same terminals of this galvanometer is shown connected a seismometer 10 through the usual amplifier 11.

The operation of the circuit for transmitting the time-break is believed to be obvious. The blaster and inductance 62 operate in the manner already described and the generated break signal passes through the two transformers and is delivered to the recording galvanometer. The signal occurs so rapidly that the condensers 68 and 73 offer no serious impedance to it.

The electrostatically shielded transformers serve to prevent the finally recorded impulse from being recorded on other elements of the galvanometer by cross-coupling or cross-feeding to adjacent circuits.

To complete a telephone circuit using the same equipment and cables, a combined transmitter and receiver of conventional form shown at 80 is connected across the condenser 68 at the shooter's end while a similar telephone unit 81 is connected across the condenser 73 at the recording end. The battery 72 provides current for the telephones while the resistor 74 serves to complete the circuit while condenser 75 keeps the telephone current out of the second transformer.

It has already been pointed out that insofar as the proper operation of the time-break circuit is concerned, except for the provision of means for differentiating the signal, that the choke 26 could be eliminated if the primary of the transformer 31 of Figure 1 is provided with adequate self-inductance. The absence of the choke may reduce the quantity L of Figure 2 to such an extent that a derivating circuit would not be established.

This difficulty can be overcome however, as shown in Figure 6, by using what may be described as a "poor" transformer at 31. Such a transformer would take the form of the common telephone transformer or some other style having an open core like the conventional induction or sparking coil. A transformer of this type provides a frequency response substantially proportional to the frequency, i. e., a greater transfer of energy takes place at higher frequencies than at lower frequencies. The involved mathematics of operation of such a transformer need not be gone into at the present time, but the results indicate that such a transformer in the position shown in Figure 6 at 31 provides in the secondary 32 a voltage which approximates the derivative of the current through the primary 30.

Under the conditions outlined above a differentiating circuit is established which does not require the breaking of the cap bridge wire to provide one of the constants, i. e., the high resistance, so that this type of circuit functions for the purpose desired even prior to the breaking of the bridge wire. If desired, a poor transformer in position 31 of Figure 1 might be used along with the rest of the elements shown in that circuit for the purpose of obtaining a second derivative, thereby further increasing the sharpness of slope of the break resulting from the destruction of the bridge wire.

Having thus described the invention, what is claimed as new and desired to be secured by Letters Patent is:

1. A time-break circuit for seismic surveying comprising in combination a source of current, an iron core inductance and the bridge wire of a blasting cap, connected in series, a recording galvanometer, a transformer connected in series with and associating said series circuit and said galvanometer; the ratio of inductance to resistance in said circuit at the time of firing of the cap being small so that the output from said transformer is substantially the derivative of the signal current change caused by the break of the bridge wire.

2. A time-break circuit for seismic surveying comprising in combination a source of current, an iron core inductance and the bridge wire of a blasting cap connected in series, a recording galvanometer, a transformer connected in series with and associating said series circuit and said galvanometer, said circuit constants being such that the transformer output changes from a multiple to a derivative of the signal voltage supplied to the circuit at the time of firing of the cap.

3. In an electrical seismograph system having a vacuum tube amplifier, a seismometer connected to the input of said amplifier, a galvanometer element of a recorder connected to the output of said amplifier and a timing means associated with said recorder and adapted to co-operate with said element to produce a seismogram, an electric blasting circuit for detonating an explosive including a source of current, an iron core inductance and the bridge wire of a blasting cap connected in series whereby a slowly rising voltage is developed in the circuit when current is applied, the breaking of the bridge wire substantialy terminating said flow and creating transients, a transformer having its primary in series in said circuit to associate it with the same element of said recorder, said circuit having such characteristics as to constitute electrical derivative taking means only when the bridge wire breaks and being adapted to take a derivative of said transients for delivery to the same element of said recorder.

4. In a time break recording system, in combination, a blasting circuit comprising a manually operated, direct current type magneto-electric machine, a switch, the bridge wire of a blasting cap and an iron core inductance all so connected in series that the breaking of the bridge wire interrupts the circuit, a recording galvanometer, means connecting said blasting circuit to said galvanometer for transmitting without change the voltage increase in said circuit when the switch is closed, said circuit arrangements being such that the transients created by the breaking of the bridge wire are alone differentiated and conducted to the recorder.

5. In a time break recording system, in combination, a blasting circuit comprising a manually operated, direct current type magneto-electric machine, a switch, the bridge wire of a blasting cap and an iron core inductance all connected in series, a recording galvanometer, a transformer having its primary in said series circuit and associating said blasting circuit with said galvanometer to transmit in unchanged relative values the voltage changes in said circuit occasioned by closing said switch, the relatively low circuit inductance plus the high resistance occasioned by the bridge wire break being such as to take the first derivative of the transient voltages resulting from said break for delivery to the galvanometer.

6. The combination with an electric seismometer and a recording galvanometer element connected to said seismometer, of a blasting circuit, said circuit comprising a manually operated direct current type magneto-electric machine, a switch and the bridge wire of a blasting cap connected in series in such a manner that breaking of the bridge wire opens the circuit, filter means in series in said circuit to eliminate high frequency pulsations originating in said machine, and means connecting said blasting circuit to said same galvanometer element.

7. In an electrical seismograph system having a vacuum tube amplifier, a seismometer connected to the input of said amplifier, a galvanometer element of a recorder connected to the output of said amplifier and a timing means associated with said recorder and adapted to cooperate with said element to produce a seismogram, an electric blasting circuit for detonating an explosive, said circuit including the bridge wire of a blasting cap, means for developing a slowly rising voltage therein, means for generating a transient voltage of opposite polarity in said circuit at the instant of detonation of the explosive as a result of the breaking of the said bridge wire, a transformer having its primary in series in said circuit, an electric circuit connected to the secondary of said transformer and adapted to transmit the changes of said voltages to the same element of the recorder, said first circuit having electrical derivative taking characteristics whereby the transient voltage is differentiated before being recorded, this differentiation shortening the time of the transient signal so that it is recorded before the seismograph signal is received.

OLIVE S. PETTY.